(12) United States Patent
Nabeta et al.

(10) Patent No.: US 9,077,090 B2
(45) Date of Patent: Jul. 7, 2015

(54) EARTH CABLE CONNECTING STRUCTURE OF SHIELDED ELECTRIC WIRE

(75) Inventors: Yasunori Nabeta, Makinohara (JP); Naoki Ito, Makinohara (JP)

(73) Assignee: Yazaki Corporation, Tokyo (JP)

( * ) Notice: Subject to any disclaimer, the term of this patent is extended or adjusted under 35 U.S.C. 154(b) by 175 days.

(21) Appl. No.: 13/808,115

(22) PCT Filed: Jul. 14, 2011

(86) PCT No.: PCT/JP2011/066076
§ 371 (c)(1),
(2), (4) Date: Jan. 3, 2013

(87) PCT Pub. No.: WO2012/008520
PCT Pub. Date: Jan. 19, 2012

(65) Prior Publication Data
US 2013/0098680 A1    Apr. 25, 2013

(30) Foreign Application Priority Data

Jul. 14, 2010   (JP) .................................. 2010-159787

(51) Int. Cl.
*H01R 4/18*   (2006.01)
*H01R 9/03*   (2006.01)
*H02G 15/02*  (2006.01)
*H01R 4/24*   (2006.01)

(52) U.S. Cl.
CPC .............. *H01R 4/184* (2013.01); *H01R 4/185* (2013.01); *H01R 9/034* (2013.01); *H02G 15/02* (2013.01)

(58) Field of Classification Search
USPC .......... 174/78, 75 C, 90, 94 R, 135; 403/274, 403/278, 281, 285, 391
See application file for complete search history.

(56) References Cited

U.S. PATENT DOCUMENTS

| | | | | |
|---|---|---|---|---|
| 3,838,387 A | * | 9/1974 | Grillet | 174/71 R |
| 4,051,323 A | * | 9/1977 | Churla | 174/78 |
| 4,840,578 A | * | 6/1989 | Sato | 439/395 |
| 6,575,762 B2 | * | 6/2003 | Evans | 439/63 |
| 7,563,984 B2 | * | 7/2009 | Bauer et al. | 174/78 |
| 2010/0294533 A1 | | 11/2010 | Yagi et al. | |

FOREIGN PATENT DOCUMENTS

| | | |
|---|---|---|
| CN | 101529534 A | 9/2009 |
| JP | 401924 | 1/1965 |

(Continued)

OTHER PUBLICATIONS

International Search Report (PCT/ISA/210) dated Oct. 4, 2011 issued by the International Searching Authority in counterpart International Application No. PCT/JP2011/066076.

(Continued)

*Primary Examiner* — Timothy Thompson
*Assistant Examiner* — Michael F McAllister
(74) *Attorney, Agent, or Firm* — Sughrue Mion, PLLC (57) ABSTRACT

An earth cable connecting structure of a shielded electric wire for connecting a shield layer of the shielded electric wire to an earth cable. The shielded electric wire includes an inner insulating layer covering a core wire, the shield layer provided in an outer periphery of the inner insulating layer and an outer insulating layer covering the shield layer. A first crimping part is crimped to the shield layer of a part from which the outer insulating layer is removed. A second crimping part is crimped to a core wire of the earth cable in an outer surface side opposite to an inner surface of the first crimping part which faces the shield layer. The first crimping part and the second crimping part are formed integrally.

10 Claims, 11 Drawing Sheets

(56) References Cited

FOREIGN PATENT DOCUMENTS

| JP | 5431191 | 3/1979 |
|---|---|---|
| JP | 2003059349 A | 2/2003 |
| JP | 2006344402 A | 12/2006 |
| JP | 2006344487 A | 12/2006 |

OTHER PUBLICATIONS

Written Opinion (PCT/ISA/237) of the International Searching Authority dated Oct. 4, 2011 in counterpart International Application No. PCT/JP2011/066076.

Office Action dated Apr. 22, 2014 issued by the Japanese Patent Office in corresponding Japanese Application No. 2010-159787.

Office Action dated Feb. 3, 2014 issued by the Korean Intellectual Property Office in corresponding Application No. 10-2013-7000527.

Communication from the Russian Patent Office dated Mar. 17, 2014, in a counterpart Russian application No. 2012155256/07.

Communication dated Feb. 3, 2015 issued by the State Intellectual Property Office of the People's Republic of China in counterpart Chinese Patent Application No. 201180033897.2.

Communication dated Sep. 24, 2014 from the Korean Intellectual Property Office in a counterpart Korean application No. 10-2013-7000527.

* cited by examiner

EARTH CABLE CONNECTING STRUCTURE OF SHIELDED ELECTRIC WIRE

TECHNICAL FIELD

The present invention relates to an earth cable connecting structure of a shielded electric wire, and more particularly to a technique for connecting a core wire of the earth cable to a shield layer of the shielded electric wire.

BACKGROUND ART

For instance, in patent literature 1, a connecting structure is proposed which connects an earth cable to a shield layer of a coaxial cable, what is called a shielded electric wire in which a core wire is covered with an inner insulating layer, the shield layer such as a braided wire formed by braiding soft copper wires is provided in an outer periphery of the inner insulating layer and the shield layer is covered with an outer insulating layer. In this patent literature, the earth cable is allowed to come into contact with an outer peripheral surface of the shield layer in a part where the outer insulating layer is removed. The shield layer and a core wire of the earth cable are allowed to embrace each other and crimped and fixed by a plate shaped connecting fitting, so that the earth cable is connected to the shield layer.

On the other hand, in patent literature 2, an outer insulating layer of a shielded electric wire is cut to be shifted in the axial direction of the shielded electric wire to expose a shield layer. The shifted outer insulating layer is returned to an original position to loosen the shield layer and deform the shield layer in the shape of a collar. The collar shaped shield layer is held by a pair of plate members to which a core wire of an earth cable is crimped and fixed to connect the earth cable to the shield layer.

CITATION LIST

Patent Literature

Patent Literature 1: JP-A-2003-59349
Patent Literature 2: JP-A-2006-344487

SUMMARY OF INVENTION

Technical Problem

However, in the patent literatures 1 and 2, there is a fear that unevenness may probably arise in a contact state of the shielded electric wire and the earth cable. For instance, in the patent literature 1, since the core wire of the earth cable is allowed to come into contact with the outer peripheral surface of the shield layer to connect the earth cable to the shielded electric wire, during a crimping operation, there is a fear that the core wire of the earth cable may be possibly shifted from the shield layer to make the contact state uneven. On the other hand, in the patent literature 2, when a tension (an external force) is applied in the axial direction of the shielded electric wire, a tensile strength depends on the strength of the shield layer. At the same time, there is a fear that the shield layer may be possibly deformed due to the tension (the collar shape is returned to an original form) to cause an increase of resistance.

A problem to be solved by the present invention is to stabilize a contact state of a shielded electric wire and an earth cable.

Solution to Problem

In order to solve the above-described problem, an earth cable connecting structure of a shielded electric wire of the present invention is a connecting structure for connecting a shield layer of the shielded electric wire to an earth cable, the shielded electric layer including an inner insulating layer covering core wires, the shield layer provided in an outer periphery of the inner insulating layer and an outer insulating layer covering the shield layer, wherein a first crimping part crimped to the shield layer of a part in which the outer insulating layer is removed and a second crimping part crimped to a core wire of the earth cable in an outer surface side opposite to an inner surface of the first crimping part which faces the shield layer are formed integrally.

According to this structure, since the shield layer and the core wire of the earth cable are separately crimped in the integrally formed crimping parts so that the shielded electric wire may be electrically connected to the earth cable, a crimping operation suitable for the crimping parts respectively can be carried out. Accordingly, a contact state of the shield layer or the core wire of the earth cable respectively in the crimping parts can be stabilized. Further, since the shield layer is crimped so as to meet the form of the shield layer, the shield layer can be crimped without deforming the shield layer.

In this case, the crimping parts can be respectively formed so that an axial direction of the shielded electric wire is parallel to an axial direction of the earth cable. Thus, the shielded electric wire and the earth cable can be arranged so as to be overlapped on each other. Thus, a space necessary for wiring can be reduced.

Further, the first crimping part can be formed with a first crimping piece formed by bending a part of a plate member in the shape of U and the second crimping part can be formed with a U shaped second crimping piece cut from the other part of the plate member. For instance, the first crimping piece is bent so that a top part of the shape of U of the first crimping piece is located in the inner surface side facing the shield layer and the second crimping piece is cut so that a top part of the shape of U of the second crimping piece is located in the outer surface side opposite to the inner surface of the first crimping part which faces the shield layer. Further, a bottom of the first crimping piece formed to be bent in the shape of U and a bottom of the second crimping piece cut to the shape of U are located on the same straight line. Thus, the shield layer or the core wire of the earth cable is arranged inside each of the crimping pieces. For instance, the crimping pieces are respectively caulked so that the shield layer and the core wire of the earth cable may be crimped.

Further, an axial length of the part in which the outer insulating layer is removed can be formed so as to correspond to an axial length of the first crimping part. Thus, the first crimping part abuts on the outer insulating layer. Even when the first crimping part is pulled in the axial direction by, for instance, an external force, since an axial movement of the first crimping part can be regulated by the outer insulating layer, a tensile strength in the first crimping part can be improved.

Advantageous Effects of Invention

According to the present invention, the contact state of the shielded electric wire and the earth cable can be stabilized.

DESCRIPTION OF EMBODIMENTS

Now, the present invention will be described below in accordance with embodiments.
(First Embodiment)

As shown in FIGS. 1 to 3B, an earth cable connecting structure of a shielded electric wire of a first embodiment includes, for instance, a shield electric wire 1 connected to a device mounted on a vehicle, an earth cable 3 connected to the shielded electric wire 1 and a connecting fitting 5 which crimps the earth cable 3 to the shielded electric wire 1. The shielded electric wire 1 is formed with, for instance, one pair of signal wires 7, a shield layer 11 provided in an outer periphery of the one pair of signal wires 7 and an outer insulating layer 13 covering the shield layer 11. Each of the signal wires 7 includes a core wire 15 to which an electric signal is supplied from a device of a connection mate and an insulating layer 17 covering the core wire 15. Namely, the insulating layer 17 is provided as an inner insulating layer of each of the core wires 15 of the shielded electric wire 1. The insulating layer 17 is formed with, for instance, a resin having an insulating property.

Figure 2:
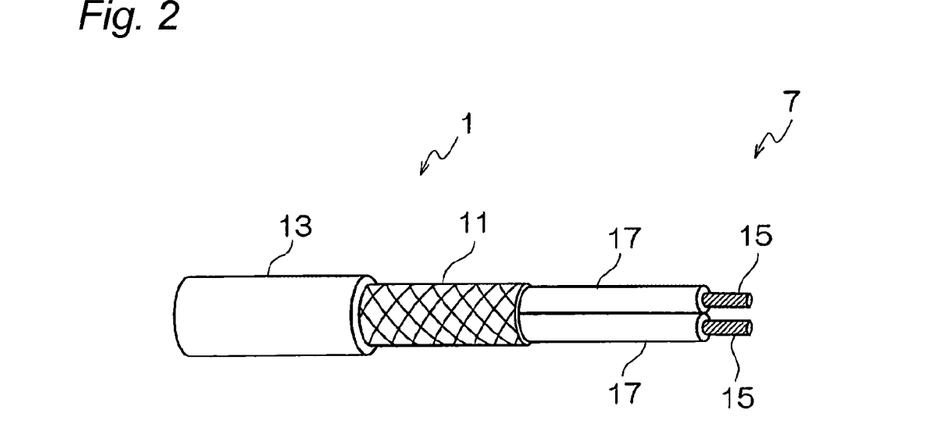
FIG. 2 is a diagram showing the shielded electric wire of the first embodiment.

The shield layer 11 is, for instance, a braided wire formed by braiding electrically conductive metal wires and formed so as to cover outer peripheral surfaces of the insulating layers 17 of the signal wires 7 respectively. The outer insulating layer 13 is formed with, for instance, a resin having an insulating property.

Figure 1:
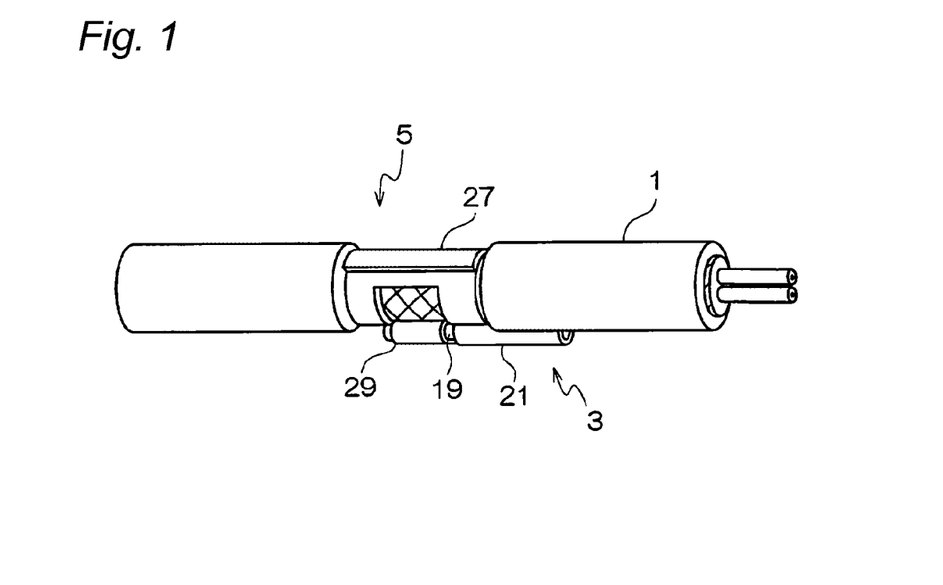
FIG. 1 is a side view of an earth cable connecting structure of a shielded electric wire of a first embodiment.

The earth cable 3 is formed by covering a core wire 19 with an insulating layer 21. The core wire 19 is formed, for instance, by twisting thin metal wires. The insulating layer 21 is formed with, for instance, a resin having an insulating property.

Figure 3A:
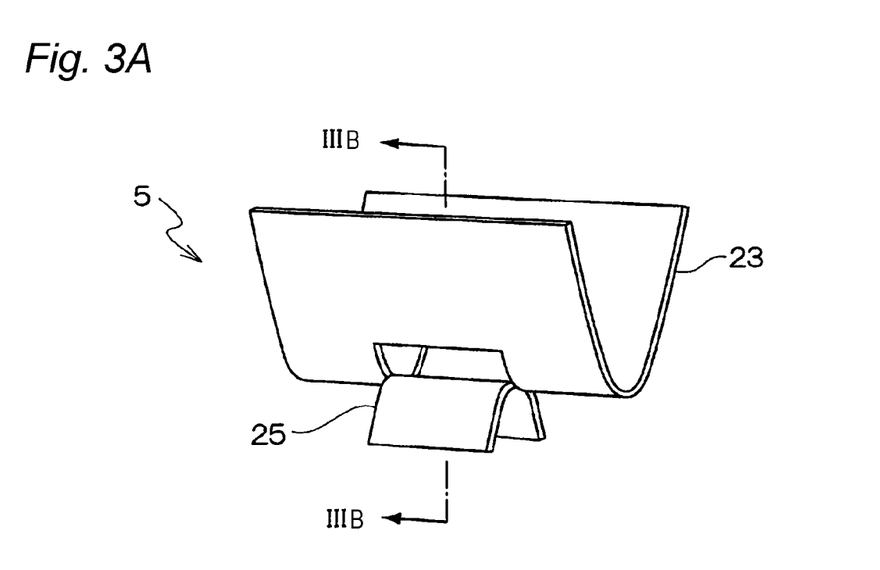
FIG. 3A is a diagram showing a connecting fitting of the first embodiment.
Figure 3B:
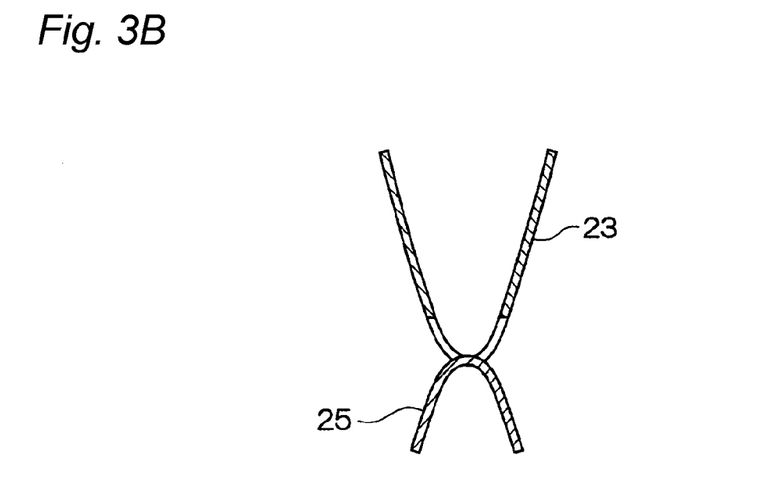
FIG. 3B is a sectional view with a position of a line IIIB-IIIB of FIG. 3A viewed in a direction shown by an arrow mark.

The connecting fitting 5 is formed with a plate member made of metal having an electric conductivity and includes a first crimping piece 23 crimped to the shield layer 11 in a part where the outer insulating layer 13 is removed and a second crimping piece 25 crimped to the core wire 19 of the earth cable 3. The crimping pieces 23 and 25 are formed integrally by, for instance, a press working of one plate member. The crimping piece 23 is formed by bending a part of the plate member in the shape of U. The crimping piece 23 arranges the exposed shield layer 11 in an inner surface side of the shape of U and opposed plate parts of the crimping piece 23 are bent toward the shield layer 11 side so that a first crimping part 27 crimped to the shield layer 11 may be formed. The crimping piece 25 is cut to an opposite side (namely, an outer surface side opposite to the inner surface facing the shield layer 11) of the plate member relative to the crimping piece 23 and formed in the shape of U. In the crimping piece 25, the core wire 19 of the earth cable 3 is arranged inside the shape of U and both ends of the crimping piece 25 are bent so that a second crimping part 29 crimped to the core wire 19 of the earth cable 3 may be formed. The crimping piece 23 and the crimping piece 25 are formed, as shown in FIG. 3B, in such a way that top parts of the shapes of U are butted against each other, and an axial direction of the shielded electric wire 1 is parallel to an axial direction of the earth cable 3 when the shielded electric wire 1 is connected to the earth cable 3. At this time, a bottom of the crimping piece 23 formed to be bent in the shape of U and a bottom of the crimping piece 25 cut to the shape of U are located on the same straight line.

Figure 4:
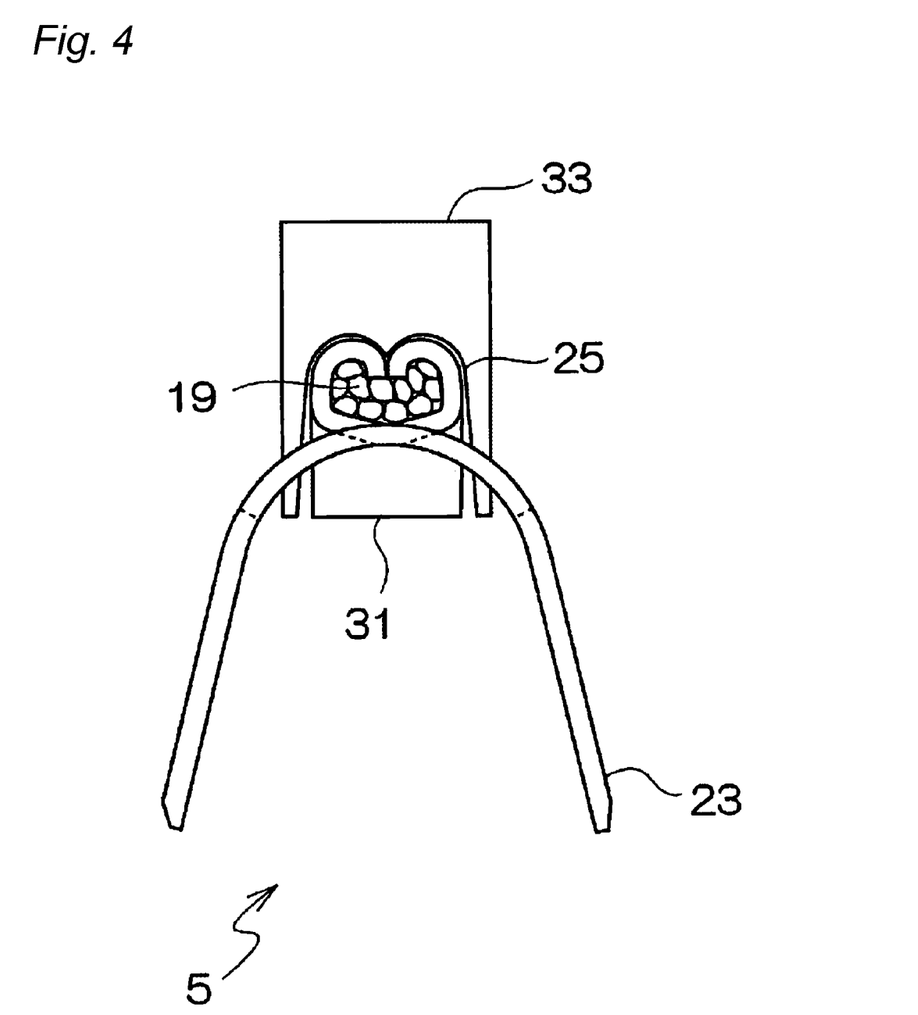
FIG. 4 is a diagram showing an operation for forming a second crimping part in FIG. 1.
Figure 5:
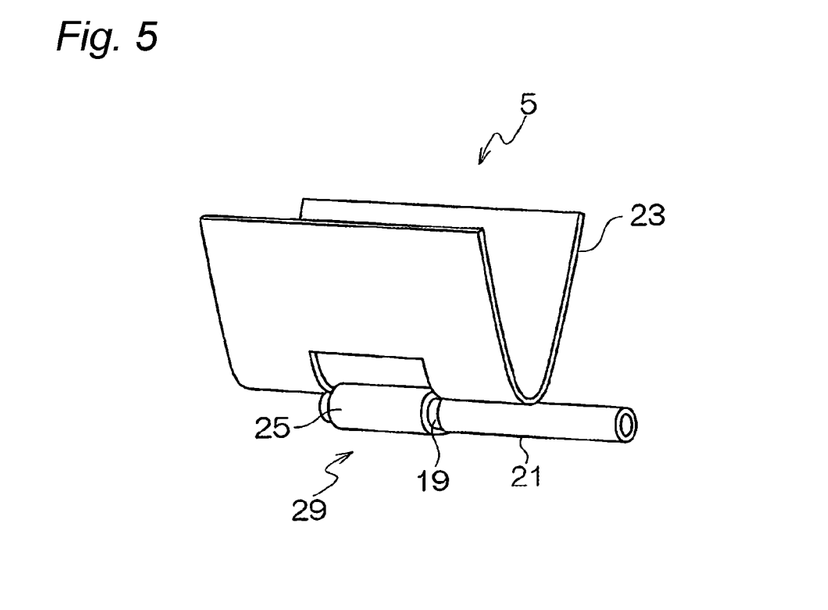
FIG. 5 is a diagram showing a state that an earth cable is crimped to the connecting fitting shown in FIG. 3A and FIG. 3B.
Figure 6:
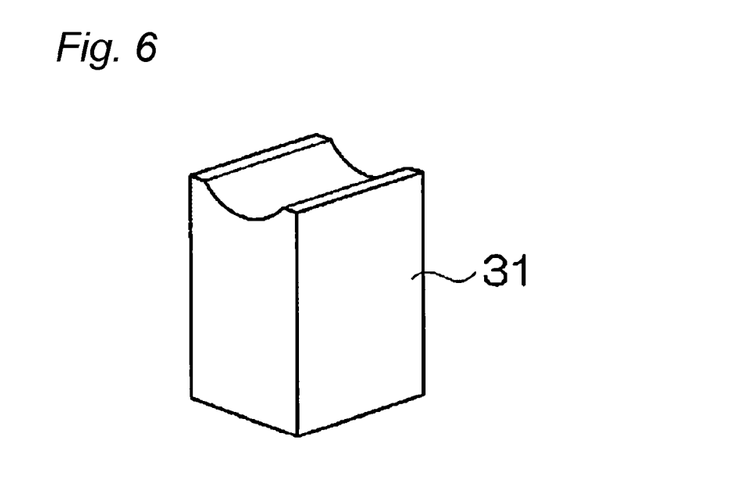
FIG. 6 is a diagram showing an anvil in FIG. 4.

Now, a connecting structure and a connecting operation that connect the shielded electric wire 1 to the earth cable 3 as one feature of the first embodiment will be described below. Initially, the insulating layer 21 in an end part of the earth cable 3 is peeled to expose the core wire 19. The exposed core wire 19 is arranged inside the crimping piece 25 of the connecting fitting 5. Under this state, as shown in FIG. 4, an anvil 31 as a base is arranged in the top part side of the shape of U of the crimping piece 25 and a crimper 33 as a crimping jig is arranged in a skirt part side of the shape of U of the crimping piece 25. Then, the crimping piece 25 is sandwiched between the anvil 31 and the crimper 33 to, for instance, caulk the crimping piece 25. Thus, as shown in FIG. 5, the crimping part 29 is formed to which the core wire 19 of the earth cable 3 is crimped. A surface of the anvil 31 which comes into contact with the crimping piece 25 is formed in a bent surface along the top part of the crimping piece 25 as shown in FIG. 6. Further, the crimper 33 is formed so as to bend the skirt part of the crimping piece 25 inside so that the crimping piece 25 may be crimped to the core wire 19 of the earth cable 3.

Figure 7:
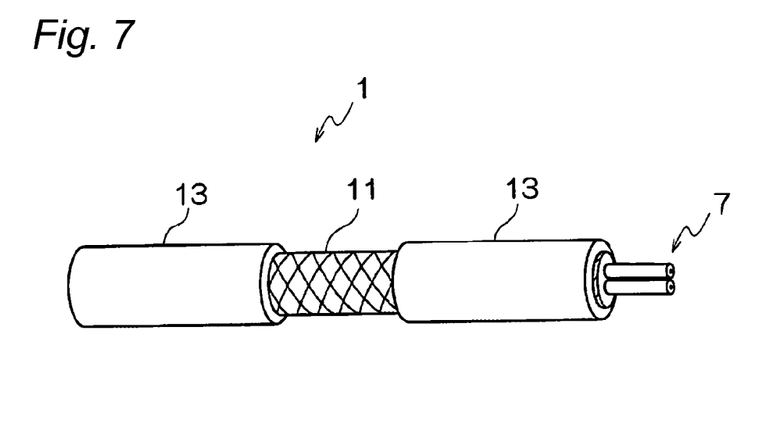
FIG. 7 is a diagram showing a state that an outer insulating layer of the shielded electric wire shown in FIG. 2 is removed.
Figure 8:
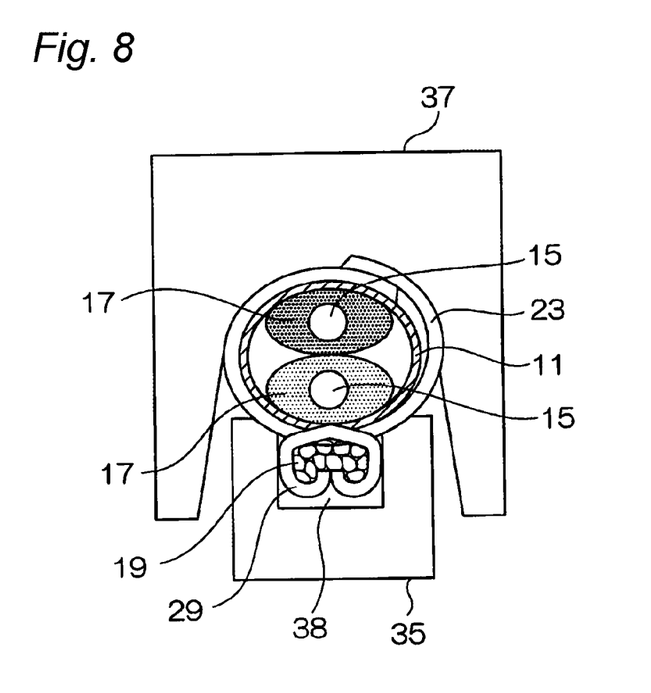
FIG. 8 is a diagram showing an operation for forming a first crimping part in FIG. 1.
Figure 9:
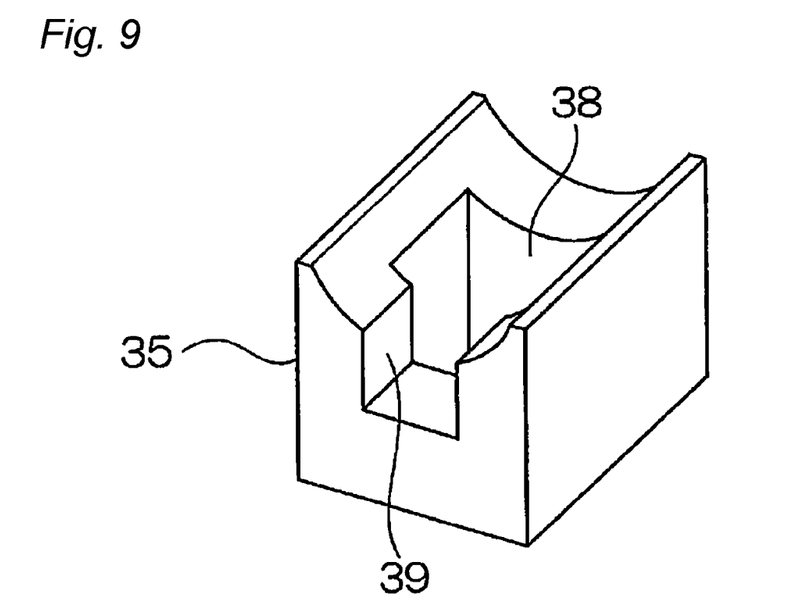
FIG. 9 is a diagram showing an anvil shown in FIG. 8.

On the other hand, in the shielded electric wire 1, a part of the outer insulating layer 13 is removed to expose the shield layer 11 as shown in FIG. 7. A dimension of removal of the outer insulating layer 13 is set to a dimension in which an axial length of the crimping part 27 formed by the crimping piece 23 corresponds to an axial length of the part where the outer insulating layer 13 is removed. The exposed shield layer 11 is arranged inside the crimping piece 23 of the connecting fitting 5 to which the earth cable 3 is crimped. At this time, the shield layer 11 is arranged in the crimping piece 23 so that the axial direction of the shielded electric wire 1 is parallel to the axial direction of the earth cable 3. Under this state, as shown in FIG. 8, an anvil 35 as a base is arranged in the top part side of the shape of U of the crimping piece 23 and a crimper 37 as a crimping jig is arranged in a skirt part side of the shape of U of the crimping piece 23. Then, the crimping piece 23 is sandwiched between the anvil 35 and the crimper 37 to, for instance, caulk the crimping piece 23. Thus, the crimping part 27 is formed to which the shield layer 11 is crimped. Thus, the core wire 19 of the earth cable 3 is electrically connected to the shield layer 11 of the shielded electric wire 1 through the connecting fitting 5. Then, when the other end of the earth cable 3 is grounded to, for instance, a vehicle body, external noise of the shielded electric wire 1 can be released to the earth cable 3 from the shield layer 11. Thus, the entry of the noise to the one pair of signal wires 7 of the shielded electric wire 1 can be interrupted. A surface of the anvil 35 which comes into contact with the crimping piece 23 is formed in a bent surface along the top part of the crimping piece 23 as shown in FIG. 9, and is provided with a groove 38 which can accommodate the crimping part 29 and a groove 39 which releases the earth cable 3 crimped to the crimping part 29. Further, the crimper 37 is formed so as to bend the skirt part of the crimping piece 23 inside so that the shield layer may be crimped by the crimping piece 23.

According to the first embodiment, since the shield layer 11 and the core wire 19 of the earth cable 3 are separately crimped so that the shielded electric wire 1 may be electrically connected to the earth cable 3, a crimping operation suitable for the shield layer 11 or the core wire 19 of the earth cable 3 can be carried out. As a result, a contact state of the shield layer 11 and the crimping piece 23 and a contact state of the core wire 19 of the earth cable 3 and the crimping piece 25 respectively in the crimping parts 27 and 29 can be stabilized. Further, since the crimping piece 23 can be crimped so as to meet the form of the shield layer 11, the crimping piece 23 can be crimped without deforming the shield layer 11. Thus, a contact area of the shield layer 11 and the crimping piece 23 and a contact area of the core wire 19 of the earth cable 3 and the crimping piece 25 are stabilized to stabilize an electric connection of the shielded electric wire 1 and the earth cable 3.

Further, since the earth cable 3 is connected to the shielded electric wire 1 so that the axial direction of the shielded electric wire 1 is parallel to the axial direction of the earth cable 3, the shielded electric wire 1 and the earth cable 3 can be arranged so as to be overlapped each other. Thus, a space necessary for wiring can be reduced.

Further, the axial length of the crimping part 27 is formed so as to correspond to the axial length of the part where the outer insulating layer 13 is removed and axial end parts of the crimping part 27 abut on the outer insulating layer 13. Accordingly, even when the crimping part 27 is pulled in the axial direction by, for instance, an external force, since an axial movement of the crimping part 27 can be regulated by the outer insulating layer 13, a tensile strength in the crimping part 27 can be improved.

A connecting position of the shielded electric wire 1 and the earth cable 3 is not limited to the first embodiment, and, for instance, an end part of the shielded electric wire 1 may be suitably selected.

Further, a position of the crimping part 29 is not limited to the present embodiment and may be formed by shifting the crimping part 29 in the circumferential direction of the crimping part 27.

Further, the shield layer 11 is not limited to the braided wire and may be formed with, for instance, a metal foil.

Figure 10:
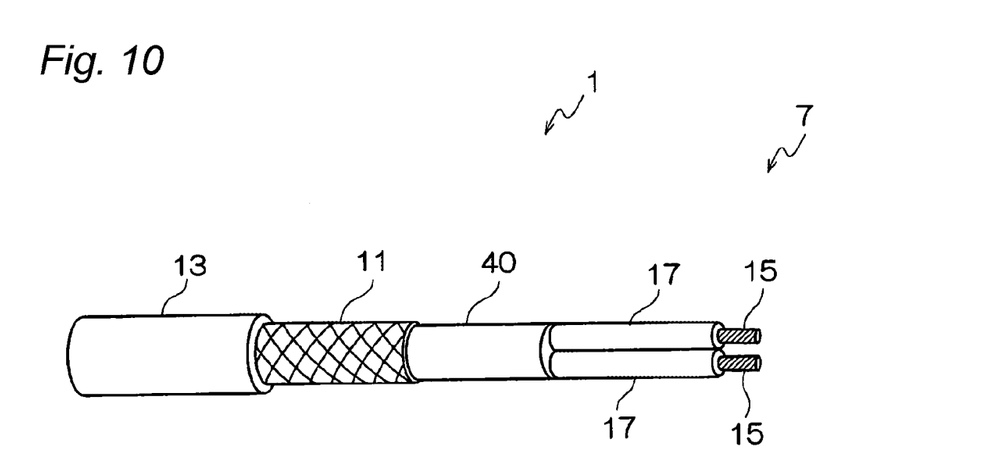
FIG. 10 is a diagram showing a modified example of the shielded electric wire in FIG. 2.

Further, as shown in FIG. 10, a shielded electric wire 1 may be used in which an insulating layer 40 is interposed between the insulating layers 17 of the one pair of signal wires 7 and the shield layer 11 in place of the shielded electric wire 1 shown in FIG. 2.

(Second Embodiment)

An earth cable connecting structure of a shielded electric wire of a second embodiment will be described by using FIG. 11A to FIG. 11D. A difference of the second embodiment from the first embodiment resides in that not only a shield layer 11 and a core wire 19 of an earth cable 3, but also an insulating layer 21 of the earth cable 3 is crimped. Namely, a crimping part 41 is formed which is crimped to the insulating layer of the earth cable 3 on an outer surface of a crimping part 27, and the crimping parts 27, 29 and 41 are formed integrally. Since other structures are the same as those of the first embodiment, they are designated by the same reference numerals and an explanation thereof is omitted.

Figure 11A:
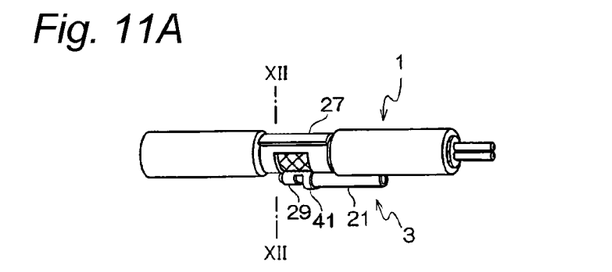
FIG. 11A is a side view of an earth cable connecting structure of a shielded electric wire of a second embodiment.
Figure 11B:
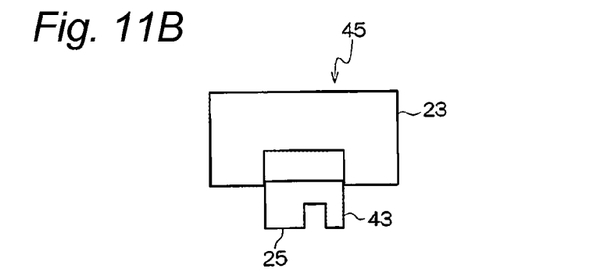
FIG. 11B is a side view of a connecting fitting of the second embodiment.
Figure 11C:
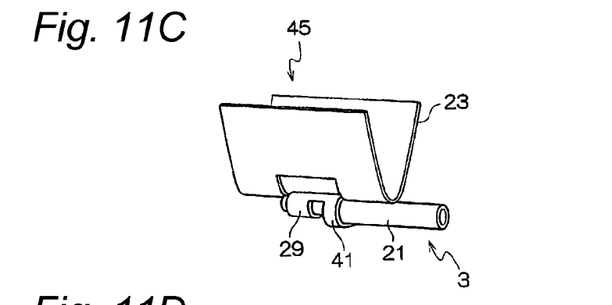
FIG. 11C is a diagram showing a state that an earth cable is crimped to the connecting fitting in FIG. 11B.

The crimping part 41 has a U shaped crimping piece 43 which is cut from a plate member of a connecting fitting 45. The crimping piece 43 is provided continuously to a crimping piece 25 and formed to be cut in the same direction as that of the crimping piece 25. Namely, the crimping piece 25 is formed to be cut in an opposite side to the plate member of the connecting fitting 45 relative to a crimping piece 23. In the crimping piece 43, the insulating layer 21 of the earth cable 3 is arranged inside the shape of U and both ends of the crimping piece 43 are bent so that the crimping part 41 crimped to the insulating layer 21 of the earth cable 3 may be formed.

Accordingly, since a movement of the earth cable 3 in a connecting part can be regulated by the crimping part 41, for instance, even when an external force is applied to the earth cable 3, the external force can be restrained from being transmitted to the core wire 19 of the crimping part 29. Thus, a contact state of the core wire 19 of the earth cable 3 and the crimping piece 25 can be maintained.

Figure 11D:
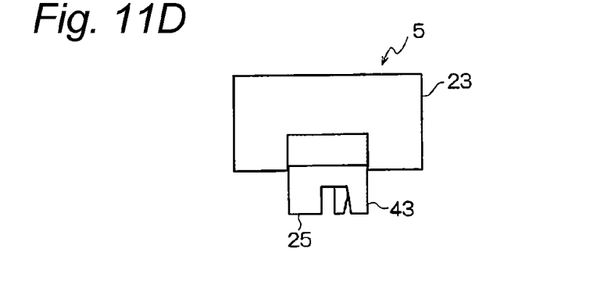
FIG. 11D is a diagram showing a modified example of the connecting fitting shown in FIG. 11B.

As shown in FIG. 11D, opposed plate parts of the crimping piece 43 may be formed to be shifted to each other in the axial direction of the earth cable 3.

Figure 12A:
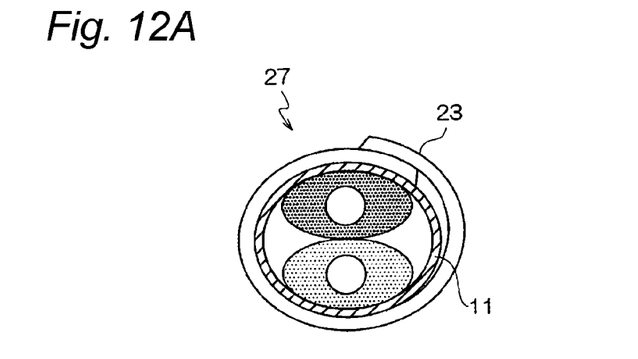
FIGS. 12A-12C are sectional views showing a structure of a first crimping part with a position of a line XII-XII of FIG. II A. viewed in a direction shown; by arrow marks.
Figure 12B:
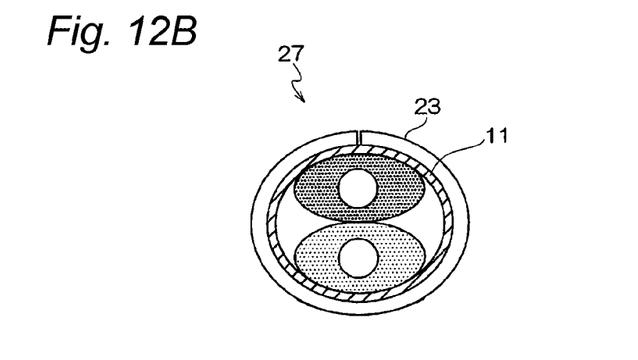
Figure 12C:
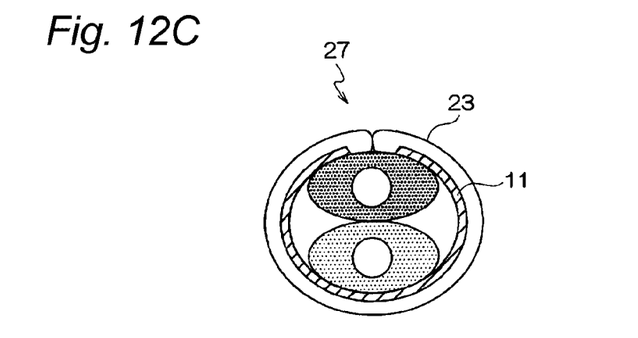

Further, a crimping structure of the crimping part 27 may be suitably selected. When the crimping structure of the crimping part 27 is explained by using, for instance, FIG. 12 showing that the crimping part 27 is cut along a line XII-XII shown in FIG. 11A, may be employed a structure that opposed plate parts of the crimping piece 23 are overlapped on each other and crimped as shown in FIG. 12A, a structure that end faces of the opposed plate parts of the crimping piece 23 are butted against each other and crimped as shown in FIG. 12B and a structure the end faces of the opposed plate parts of the crimping piece 23 are allowed to bite on a shield layer 11 and crimped as shown in FIG. 12C.

(Third Embodiment)

Figure 13A:
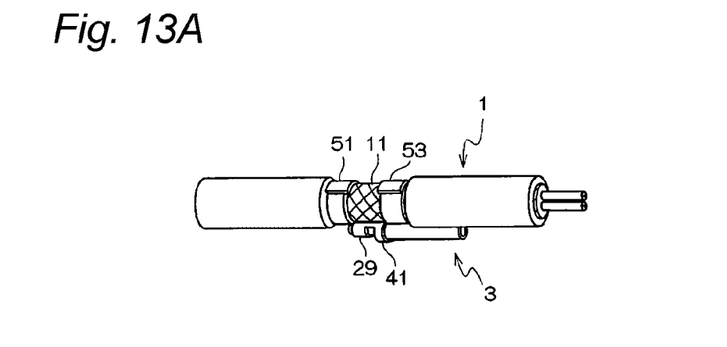
FIG. 13A is a side view of an earth cable connecting structure of a shielded electric wire of a third embodiment.
Figure 13B:
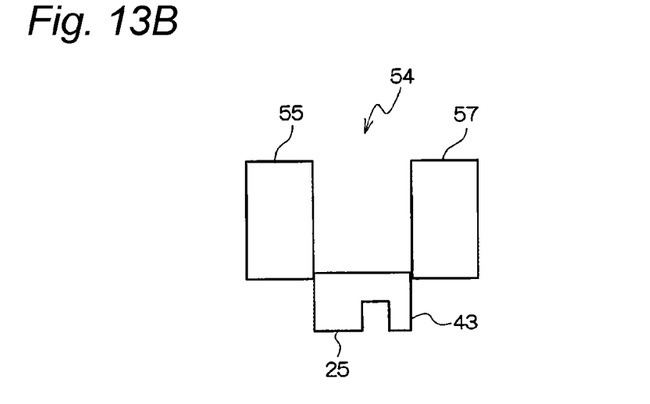
FIG. 13B is a side view of a connecting fitting of the third embodiment.
Figure 13C:
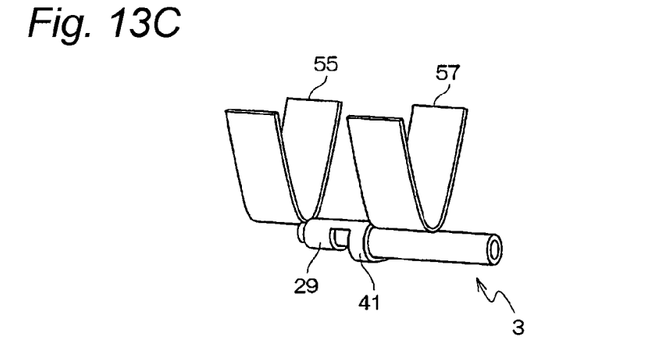
FIG. 13C is a diagram showing a state that an earth cable is crimped to the connecting fitting in FIG. 13B.

An earth cable connecting structure of a shielded electric wire of a third embodiment as a modified example of the second embodiment will be described by using FIG. 13A to FIG. 13C. A difference of the third embodiment from the second embodiment resides in that a crimping part 27 is divided into two in the axial direction of a shielded electric wire 1 to form crimping parts 51 and 53. Since other structures are the same as those of the second embodiment, they are designated by the same reference numerals and an explanation thereof is omitted.

The crimping parts 51 and 53 respectively have crimping pieces 55 and 57 integrally formed by bending, for instance, a plate member of a connecting fitting 54 in the shape of U. The crimping piece 55 arranges an exposed shield layer 11 inside the shape of U and opposed plate parts of the crimping piece 55 are bent toward the shield layer 11 side so that the crimping part 51 crimped to the shield layer 11 may be formed. The crimping piece 57 arranges an exposed shield layer 11 inside the shape of U and opposed plate parts of the crimping piece 57 are bent toward the shield layer 11 side so that the crimping part 53 crimped to the shield layer 11 may be formed.

Thus, the connecting fitting 54 to which an earth cable 3 is connected can be crimped to the shield layer 11 of the shielded electric wire 1, so that the shielded electric wire 1 can be connected to the earth cable 3. Namely, in the third embodiment, the crimping piece 23 of the second embodiment is divided into two along the axial direction of the shielded electric wire 1. The crimping parts 51 and 53 crimped to the shield layer 11 are formed by the divided crimping pieces 55 and 57.

(Fourth Embodiment)

An earth cable connecting structure of a shielded electric wire of a fourth embodiment as a modified example of the third embodiment will be described by using FIG. 14A to FIG. 14D. A difference of the fourth embodiment from the third embodiment resides in that one of opposed plate parts of crimping pieces 55 and 57 respectively are formed to be longer than the other. Since other structures are the same as those of the third embodiment, they are designated by the same reference numerals and an explanation thereof is omitted.

Figure 14A:
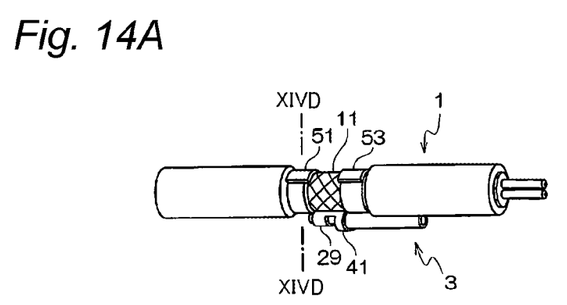
FIG. 14A is a side view of an earth cable connecting structure of a shielded electric wire of a fourth embodiment.
Figure 14B:
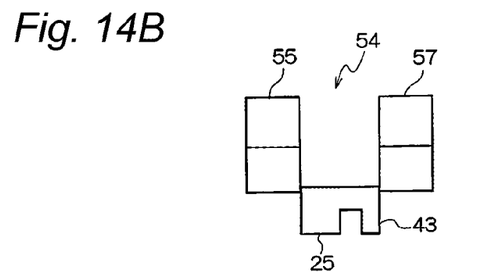
FIG. 14B is a side view of a connecting fitting of the fourth embodiment.
Figure 14C:
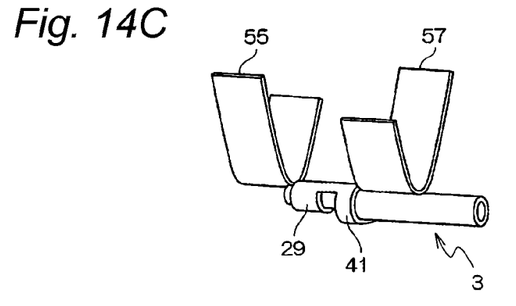
FIG. 14C is a diagram showing a state that an earth cable is crimped to the connecting fitting in FIG. 14B.
Figure 14D:
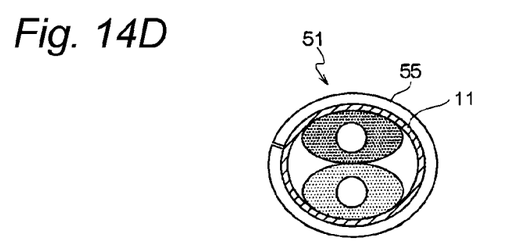
FIG. 14D is a sectional view with a position of a line XIVD-XIVD of FIG. 14A viewed in a direction shown by arrow marks.

Thus, the crimping pieces 55 and 57 are respectively wound on a periphery of a shield layer 11 to be crimped thereto, so that crimping parts 51 and 53 can be formed. In this case, as shown in FIG. 14D, the crimping part 51 can be formed in such a way that the opposed plate parts of the bent crimping piece 55 are not overlapped on each other. Further, through not shown in the drawing, the crimping part 53 can be also formed in such a way that the opposed plate parts of the crimping piece 57 are not overlapped on each other as in the crimping part 51.

(Fifth Embodiment)

An earth cable connecting structure of a shielded electric wire of a fifth embodiment as a modified example of the second embodiment will be described by using FIG. 15A to FIG. 15D. A difference of the fifth embodiment from the second embodiment resides in that a crimping part 27 crimped to a shield layer 11 is formed by a crimping piece 63 having opposed plate parts of a crimping piece 23 formed to shift to each other in the axial direction of a shielded electric wire 1. Since other structures are the same as those of the second embodiment, they are designated by the same reference numerals and an explanation thereof is omitted.

Figure 15A:
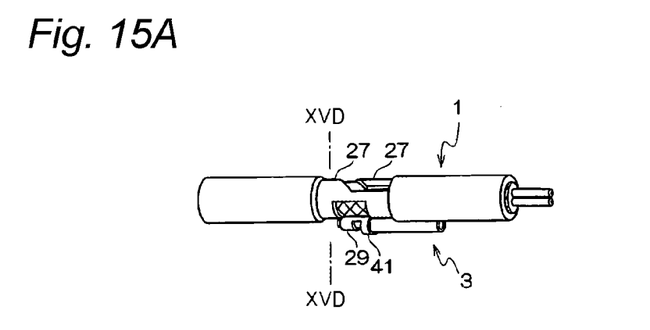
FIG. 15A is a side view of an earth cable connecting structure of a shielded electric wire of a fifth embodiment.
Figure 15B:
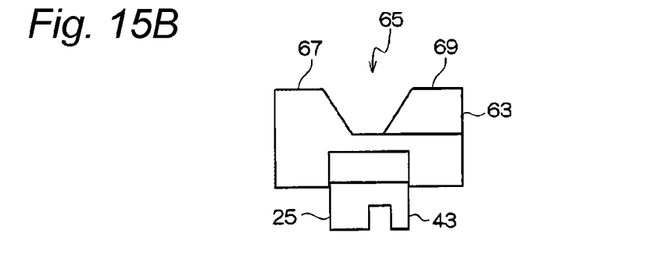
FIG. 15B is a side view of a connecting fitting of the fifth embodiment.
Figure 15C:
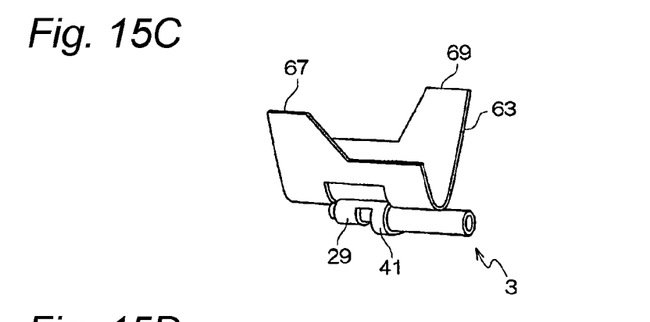
FIG. 15C is a diagram showing a state that an earth cable is crimped to the connecting fitting in FIG. 15B.
Figure 15D:
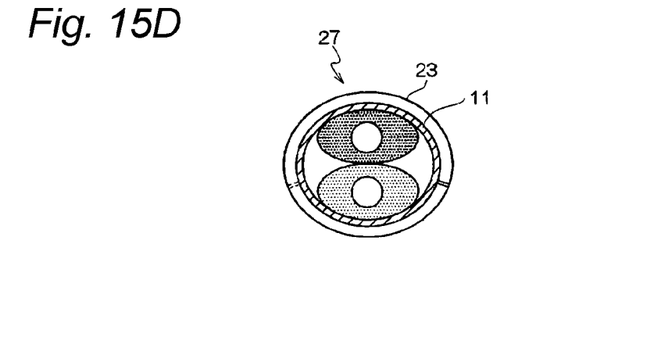
FIG. 15D is a sectional view with a position of a line XVD-XVD of FIG. 15A viewed in a direction shown by arrow marks.

The crimping piece 63 crimped to the shield layer 11 is formed by bending, for instance, a plate member of a connecting fitting 65 in the shape of U. Plate parts 67 and 69 of the shape of U of the crimping piece 63 are formed to shift to each other in the axial direction of the shielded electric wire 1. Namely, the opposed plate parts 67 and 69 are respectively formed to shift to each other in the axial direction of the shielded electric wire 1 so that the opposed plate parts 67 and 69 of the crimping piece 63 are not overlapped on each other in the crimping part 27. The plate parts 67 and 69 are respectively wound on the periphery of the shield layer 11, crimped thereto so that the crimping part 27 crimped to the shield layer 11 may be formed.

The present invention is described in detail by referring to the specific embodiments. However, it is to be understood to a person with ordinary skill in the art that various changes or modifications may be made without departing the spirit and scope of the present invention.

This application is based on Japanese Patent Application No. 2010-159787 filed on Jul. 14, 2010 and contents thereof are incorporated herein as a reference.

INDUSTRIAL APPLICABILITY

According to the earth connecting structure of the shielded electric wire of the present invention, a contact state of the shielded electric wire and the earth cable can be effectively stabilized.

REFERENCE SIGNS LIST 1 shielded electric wire
3 earth cable
11 shield layer
13 outer insulating layer
15 core wire
19 core wire
23 crimping piece
25 crimping piece
27 crimping part
29 crimping part
41 crimping part
43 crimping piece
51 crimping part
53 crimping part
55 crimping piece
57 crimping piece
63 crimping piece

The invention claimed is:

1. An earth cable connecting structure of a shielded electric wire for connecting a shield layer of the shielded electric wire to an earth cable, the shielded electric wire including an inner insulating layer covering a core wire, the shield layer provided in an outer periphery of the inner insulating layer and an outer insulating layer covering the shield layer, wherein a first crimping part crimped to the shield layer of a part from which the outer insulating layer is removed and a second crimping part crimped to a core wire of the earth cable in an outer surface side opposite to an inner surface of the first crimping part which faces the shield layer are formed integrally, the first crimping part has a first crimping piece formed by bending a part of a plate member in the shape of U, the second crimping part has a U shaped second crimping piece cut from the other part of the plate member, the first crimping piece is formed to be bent so that a top part of the shape of U of the first crimping piece is located in the inner surface side facing the shield layer, and the second crimping piece is cut so that a top part of the shape of U of the second crimping piece is located in the outer surface side opposite to the inner surface of the first crimping part which faces the shield layer.

2. The earth cable connecting structure of the shielded electric wire according to claim 1, wherein
   a bottom of the first crimping piece formed to be bent in the shape of U and a bottom of the second crimping piece cut to the shape of U are located on the same straight line.

3. The earth cable connecting structure of the shielded electric wire according to claim 1, wherein
   an axial length of the part where the outer insulating layer is removed is set to correspond to an axial length of the first crimping part.

4. The earth cable connecting structure of the shielded electric wire according to claim 1, wherein
   the first crimping piece is crimped to and directly contacts the shield layer, and
   the seconding crimping piece is crimped to and directly contacts the core wire of the earth cable.

5. The earth cable connecting structure of the shielded electric wire according to claim 1, wherein
   the second crimping piece is formed in a center of the first crimping piece.

6. The earth cable connecting structure of the shielded electric wire according to claim 1, wherein
   the second crimping piece includes opposed plate parts, each at a respective arm of the U shape, wherein the opposed plate parts are shifted relative to each other in the axial direction of the earth cable.

7. The earth cable connecting structure of the shielded electric wire according to claim 1, wherein
   the first crimping piece includes two pairs of opposed plate parts, each at a respective arm of the U shape.

8. The earth cable connecting structure of the shielded electric wire according to claim 7, wherein
   each of the two pairs opposed plate parts includes an opposed plate part, at a respective arm of the U shape, such that the opposed plate part, of a first pair of the two pairs, is shifted relative to the opposed plate part, of a second pair of the two pairs, in the axial direction of the shielded electric wire.

9. The earth cable connecting structure of the shielded electric wire according to claim 7, wherein
   none of the opposed plate parts overlap each other.

10. The earth cable connecting structure of the shielded electric wire according to claim 7, wherein
    the second crimping part is formed between the two pairs of opposed plate parts.

* * * * *